United States Patent
Koshino et al.

(10) Patent No.: US 6,775,466 B1
(45) Date of Patent: Aug. 10, 2004

(54) DISK CONTROL APPARATUS DIVIDING A RECORDING AREA INTO RECORDED AND UNRECORDED AREAS

(75) Inventors: Toshiharu Koshino, Moriguchi (JP); Toshiki Yamamura, Suita (JP); Yuji Nagaishi, Daito (JP); Tsukasa Yoshiura, Hirakata (JP); Shinichiro Takigawa, Kyotanabe (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/513,093

(22) Filed: Feb. 25, 2000

(30) Foreign Application Priority Data

Feb. 26, 1999 (JP) ............................................. 11-051711
Feb. 9, 2000 (JP) ........................................ 2000-032377

(51) Int. Cl.[7] .............................................. H04N 5/781
(52) U.S. Cl. ........................ 386/125; 386/126; 711/165; 711/170
(58) Field of Search .............................. 386/39, 45, 96, 386/98, 104, 105, 106, 125, 126; 348/231.2, 231.4; 711/100, 102, 103, 108, 111, 133, 159, 165, 170; 360/32, 39, 40, 48; H04N 5/76, 9/79, 5/225

(56) References Cited

U.S. PATENT DOCUMENTS

| | | | |
|---|---|---|---|
| 5,099,322 A | | 3/1992 | Gove |
| 5,267,351 A | | 11/1993 | Reber et al. |
| 5,485,595 A | * | 1/1996 | Assar et al. ................. 711/103 |
| 5,559,608 A | | 9/1996 | Kunihiro |
| 5,675,769 A | * | 10/1997 | Ruff et al. ................... 711/173 |
| 5,896,364 A | * | 4/1999 | Okazaki et al. ........... 369/275.3 |
| 6,038,636 A | * | 3/2000 | Brown et al. ................ 711/103 |
| 6,154,779 A | * | 11/2000 | Otani et al. .................. 709/232 |
| 6,178,487 B1 | * | 1/2001 | Ruff et al. ................... 711/165 |
| 6,477,632 B1 | * | 11/2002 | Kikuchi ....................... 711/203 |

FOREIGN PATENT DOCUMENTS

| | | |
|---|---|---|
| EP | 0333165 A2 | 9/1989 |
| EP | 0709843 A2 | 5/1996 |
| EP | 0828251 A2 | 3/1998 |
| EP | 0851680 A1 | 7/1998 |
| JP | 04014672 A | 1/1992 |
| JP | 08129859 A | 5/1996 |
| JP | 10143977 A | 5/1998 |
| JP | 10327387 A | 12/1998 |

OTHER PUBLICATIONS

DVRaptor the complete DV camcorder editor, Canopus, XP00265161 retrieved from the internet, pp. 1–2 (Online 1998).

* cited by examiner

*Primary Examiner*—Thai Tran
(74) *Attorney, Agent, or Firm*—Akin Gump Strauss Hauer & Feld, L.L.P.

(57) ABSTRACT

In a disk control apparatus according to the present invention, after overwriting processing or block erasure processing is performed, index information on the fragmented recorded area is newly generated for managing the recording area, and recording start and end information is written to the video and audio data recorded on a disk apparatus, and edit processing can be easily performed by the disk control apparatus even after video and audio data recorded on the disk apparatus is overwritten with externally input video and audio data and after a part of the video and audio data is erased.

2 Claims, 11 Drawing Sheets

FIG. 4

INDEX MANAGEMENT LIST

| INDEX NUMBER | FRAME TOP ADDRESS |
|---|---|
| #1 | ADDRESS A |
| #2 | ADDRESS B |
| #3 | ADDRESS C |
| #4 | ADDRESS D |
| #5 | ADDRESS E |
| #6 | ADDRESS X |

FIG. 7

INDEX MANAGEMENT LIST

| INDEX NUMBER | FRAME TOP ADDRESS |
|---|---|
| #1 | ADDRESS A |
| #2 | ADDRESS B |
| #3 | ADDRESS F |
| #4 | ADDRESS G |
| #5 | ADDRESS H |
| #6 | ADDRESS Y |
| #7 | ADDRESS X |

FIG. 10

INDEX MANAGEMENT LIST

| INDEX NUMBER | FRAME TOP ADDRESS |
|---|---|
| #1 | ADDRESS A |
| #2 | ADDRESS Z |
| #3 | ADDRESS P |
| #4 | ADDRESS H |
| #5 | ADDRESS Y |
| #6 | ADDRESS X |

DISK CONTROL APPARATUS DIVIDING A RECORDING AREA INTO RECORDED AND UNRECORDED AREAS

BACKGROUND OF THE INVENTION

The present invention relates to a disk control apparatus which controls video and audio data being continuously input through a digital interface, so as to be recordable and reproducible onto and from a disk apparatus such as a hard disk device, and a disk apparatus using the disk control apparatus.

In recent years, disk apparatuses such as magnetic disk devices and optical disk devices have been rapidly improving in performance such as storage capacity and data transfer speed.

The performance improvement of the hard disk devices is particularly remarkable, and the hard disk devices have been more frequently used for recording and reproducing of video and audio data.

On the other hand, the development of digital interfaces has advanced, so that digital interfaces of the IEEE 1394 standard have become standard equipment on digital VCR apparatuses (digital video cassette recording apparatuses). The IEEE 1394 standard defines an isochronous transmission mode to continuously transmit digital video and audio data.

In the transmission mode using the IEEE 1394 interface, for example, IEC61883 defines a transmission mode for video and audio data of a digital VCR format (hereinafter, abbreviated as DV format).

Recently, an edit system has been proposed in which a digital VCR apparatus and a video and audio data recording apparatus incorporating a hard disk device are connected by an IEEE 1394 interface.

In this edit system, the following edit processing is performed:

(1) video and audio data to be edited are transferred from the digital VCR apparatus to the video and audio data recording apparatus through the IEEE 1394 interface, and the transferred data are recorded onto the hard disk device;

(2) the video and audio data recorded on the hard disk device are reproduced, and video scenes to be edited are searched for;

(3) necessary video scenes are selected from among the searched video scenes, and the order in which the video scenes are reproduced is decided; and (4) the video scenes are reproduced in the decided order by the video and audio data recording apparatus, and the reproduced video scenes are recorded by the digital VCR apparatus.

In the edit processing as described above, continuous video scenes shot in one shooting operation are frequently performed by selecting as one unit. When necessary video scenes are searched for from among video and audio data recorded on tape by use of a digital VCR apparatus, it is necessary to make selection while reproducing the video and audio data, so that it takes time for selecting video scenes.

To solve this problem, recent video and audio data recording apparatuses using disk apparatuses such as hard disk devices have a function to automatically detect information such as points where video scenes change (scene change points) when video and audio data are recorded onto the disk apparatus, and register the information as index information.

As described above, in the field of video and audio data recording apparatuses, a technology with which edit processing in units of video scenes can be easily performed has been proposed.

However, according to the above-mentioned edit function of the conventional disk apparatus, although editing by selecting video and audio data in units of video scenes can be easily performed, the following operations cannot be easily performed: editing by erasing only part of the video and audio data in a recorded video scene; and editing by overwriting (replacing) recorded video and audio data with externally input video and audio data.

BRIEF SUMMARY OF THE INVENTION

An object of the present invention is to provide a disk control apparatus capable of, solving the above-mentioned problems, easily thereby to perform edit processing, even after overwriting of video and audio data recorded on a disk apparatus by inputting video and audio data from external source and even after erasing only a part of video and audio data, and provide a disk apparatus using the disk control apparatus.

To solve the above-mentioned object, a disk control apparatus according to the present invention comprises:

an interface unit for receiving externally input video and audio data;

an index generation unit for generating index information by analyzing the video and audio data received by the interface unit;

an index information management unit for managing the index information generated by the index generation unit;

a data recording and reproducing unit for writing and reading the video and audio data received by the interface unit onto and from a disk apparatus; and a video and audio data management unit for managing a recording area of the disk apparatus by dividing the recording area into a recorded area in which video and audio data have already been recorded and an unrecorded area in which no video and audio data is recorded.

When the recorded area is overwritten with different video and audio data, the index information generation unit generates index information corresponding to the video and audio data in the overwritten area and index information corresponding to video and audio data in other areas separated by the video and audio data in the overwritten area.

The disk control apparatus according to the present invention structured as described above is capable of easily performing edit processing on recorded video and audio data even after part of the video and audio data recorded on the disk apparatus is erased and after the video and audio data are replaced with external video and audio data.

A disk control apparatus according to another aspect of the present invention comprises:

an interface unit for receiving externally input video and audio data;

a data recording and reproducing unit for writing and reading the video and audio data received by the interface unit onto and from a disk apparatus; and a video and audio data management unit for managing a recording area of the disk apparatus by dividing the recording area into a recorded area in which video and audio data have already been recorded and an unrecorded area in which no video and audio data is recorded.

In response to an external block erasure request, the video and audio data management unit erases an area requested to be erased from the recorded area, adds the area requested to be erased to the unrecorded area, and assigns continuous logical addresses to the video and audio data in the recorded area.

The disk control apparatus according to the present invention structured as described above is capable of easily performing edit processing on recorded video and audio data even after a block is erased, in response to an external request, from the video and audio data recorded on the disk apparatus.

A disk apparatus according to the present invention comprises:

an interface unit for receiving externally input video and audio data;

an index generation unit for generating index information by analyzing the video and audio data received by the interface unit;

an index information management unit for managing the index information generated by the index generation unit;

a data recording and reproducing unit for writing and reading the video and audio data received by the interface unit onto and from a disk; and a video and audio data management unit for managing a recording area of the disk by dividing the recording area into a recorded area in which video and audio data have already been recorded and an unrecorded area in which no video and audio data is recorded.

When the recorded area is overwritten with different video and audio data, the index information generation unit generates index information corresponding to the video and audio data in the overwritten area, and index information corresponding to video and audio data in other areas separated by the video and audio data in the overwritten area.

The disk apparatus according to the present invention structured as described above is capable of easily performing edit processing on recorded video and audio data even after part of the video and audio data recorded on the disk is erased and after the video and audio data are replaced with external video and audio data.

A disk apparatus according to another aspect of the present invention comprises;

an interface unit for receiving externally input video and audio data;

a data recording and reproducing unit for writing and reading the video and audio data received by the interface unit onto and from a disk; and a video and audio data management unit for managing a recording area of the disk by dividing the recording area into a recorded area in which video and audio data have already been recorded and an unrecorded area in which no video and audio data is recorded.

In response to an external block erasure request, the video and audio data management unit erases an area requested to be erased from the recorded area, adds the area requested to be erased to the unrecorded area, and assigns continuous logical addresses to the video and audio data in the recorded area.

The disk apparatus according to the present invention structured as described above is capable of easily performing edit processing on recorded video and audio data even after a block is erased, in response to an external request, from the video and audio data recorded on the disk.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 4 is an index management list corresponding to the DV data recorded on the disk apparatus according to the first embodiment of the present invention;

FIG. 7 is an index management list corresponding to the DV data after the DV data are re-recorded onto the disk apparatus according to the first embodiment of the present invention;

FIG. 10 is an index management list corresponding to the DV data after part of the DV data recorded on the disk apparatus according to the first embodiment of the present invention is erased;

It will be recognized that some or all of the Figures are schematic representations for purposes of illustration and do not necessarily depict the actual relative sizes or locations of the elements shown.

DETAILED DESCRIPTION OF THE INVENTION

Preferred embodiments of a disk control apparatus of the present invention and a disk apparatus using the same will be hereafter described with reference to the attached drawings.

<First Embodiment>

Figure 1:
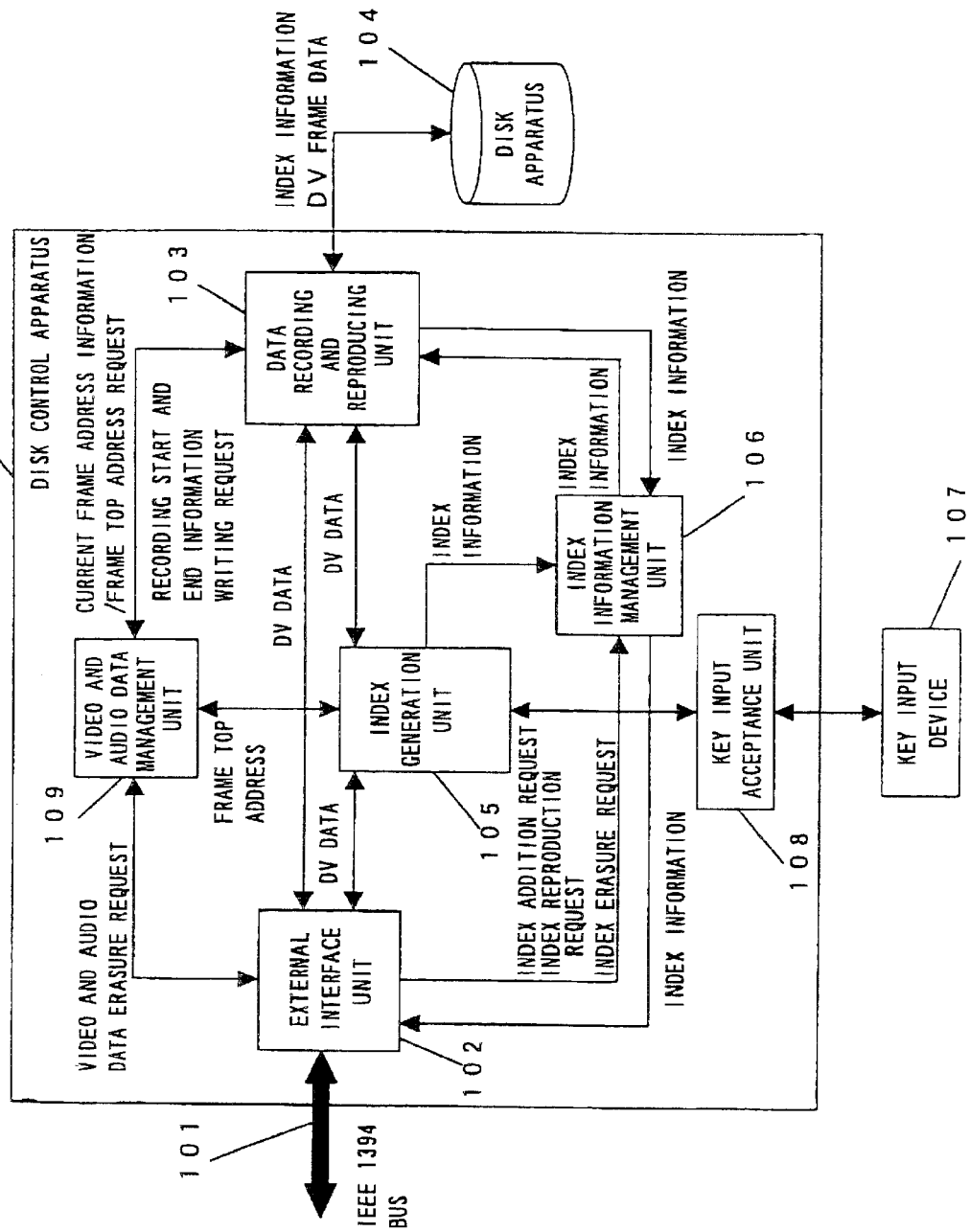
FIG. 1 is a block diagram of a disk control apparatus according to a first embodiment of the present invention.

FIG. 1 is a block diagram showing the configuration of a disk control apparatus according to a first embodiment of the present invention.

A disk control apparatus 100 of the first embodiment shown in FIG. 1 is connected to an IEEE 1394 bus 101 for transmitting video and audio data and control signals (commands) from an external apparatus such as a digital VCR (not shown). The disk control apparatus 100 is provided with an external interface unit 102 for transmitting and receiving video and audio data and digital signals such as control signals to and from the external apparatus through the IEEE 1394 bus 101. On the IEEE 1394 bus 101, digital data of the DV format standardized by IEC 61883 (hereinafter, abbreviated as DV data) is transmitted as video and audio data. The external interface unit 102 has a function to receive DV data and transfer DV data to a data recording and reproducing unit 103.

The data recording and reproducing unit 103 records the DV data received from the external interface unit 102 onto a disk apparatus 104 by following a predetermined procedure.

In the first embodiment, a hard disk device (HDD) provided with an IDE interface is used as the disk apparatus 104. The recording area of the hard disk device is managed in units of 512-byte sectors, and a logical block address (LBA) is assigned to each sector. The top area (area with a small LBA) of the recordable area of the disk apparatus 104 is allocated as a system data recording area, and the remaining area is allocated as a DV data recording area.

The data recording and reproducing unit 103 divides the DV data into blocks in units of video frames (hereinafter, this block data will be referred to as DV frame data), and records and reproduces DV data onto and from the disk apparatus 104 with the DV frame data as one unit. Before transferring DV frame data to the disk apparatus 104, the data recording and reproducing unit 103 posts a frame top address request to a video and audio data management unit 109. Based on the reply to the frame top address request from the video and audio data management unit 109, the data recording and reproducing unit 103 transfers the DV frame data to the recording area of the disk apparatus 104 corresponding to the frame top address.

The video and audio data management unit 109 manages the DV data recording area of the disk apparatus 104 in units of DV frame data. Moreover, the video and audio data management unit 109 manages the DV data by dividing the DV data recording area into a recorded area where DV data have already been recorded and an unrecorded area where DV data have not been recorded yet. In the recorded area, there are cases where the logical block addresses (LBAs) are separated and present in discontinuous areas because of block erasure processing performed in response to an external block erasure request described later. In order that the DV frame data recorded in the recorded area are recorded in continuous recording areas even in such cases, the video and audio data management unit 109 assigns continuous logical frame addresses to the recorded DV frame data. Moreover, the video and audio data management unit 109 manages the logical block addresses (LBAs) corresponding to the logical frame addresses as selectable recording address conversion information.

In response to the frame top address request from the data recording and reproducing unit 103, the video and audio data management unit 109 posts the recording address on the disk apparatus 104 where the next DV frame data is to be recorded (hereinafter, this recording address will be referred to as frame top address) to the data recording and reproducing unit 103. At this time, the video and audio data management unit 109 posts the frame top address as a logical block address (LBA).

Concurrently, the video and audio data management unit 109 stores the frame top address and the corresponding logical frame address posted to the data recording and reproducing unit 103 as current frame address information. Moreover, the video and audio data management unit 109 stores the logical frame address corresponding to the last recorded DV frame data as last recorded frame address information.

The data recording and reproducing unit 103 successively reads DV frame data recorded on the disk apparatus 104 in response to a reproduction command from the external apparatus, and transfers the DV frame data to the external interface unit 102. The external interface unit 102 successively sends the DV frame data transferred from the data recording and reproducing unit 103 to the external device through the IEEE 1394 bus 101.

[Recording Command Processing]

Next, recording command processing will be described which is performed by the disk control apparatus of the first embodiment after the disk control apparatus receives a recording command from the external apparatus.

First, the external interface unit 102 starts the reception of DV data through the IEEE 1394 bus 101. An index generation unit 105 reads from the video and audio data management unit 109 the frame top address corresponding to the first DV frame data which is received by the external interface unit 102, and stores the frame top address as index information.

Figure 2:
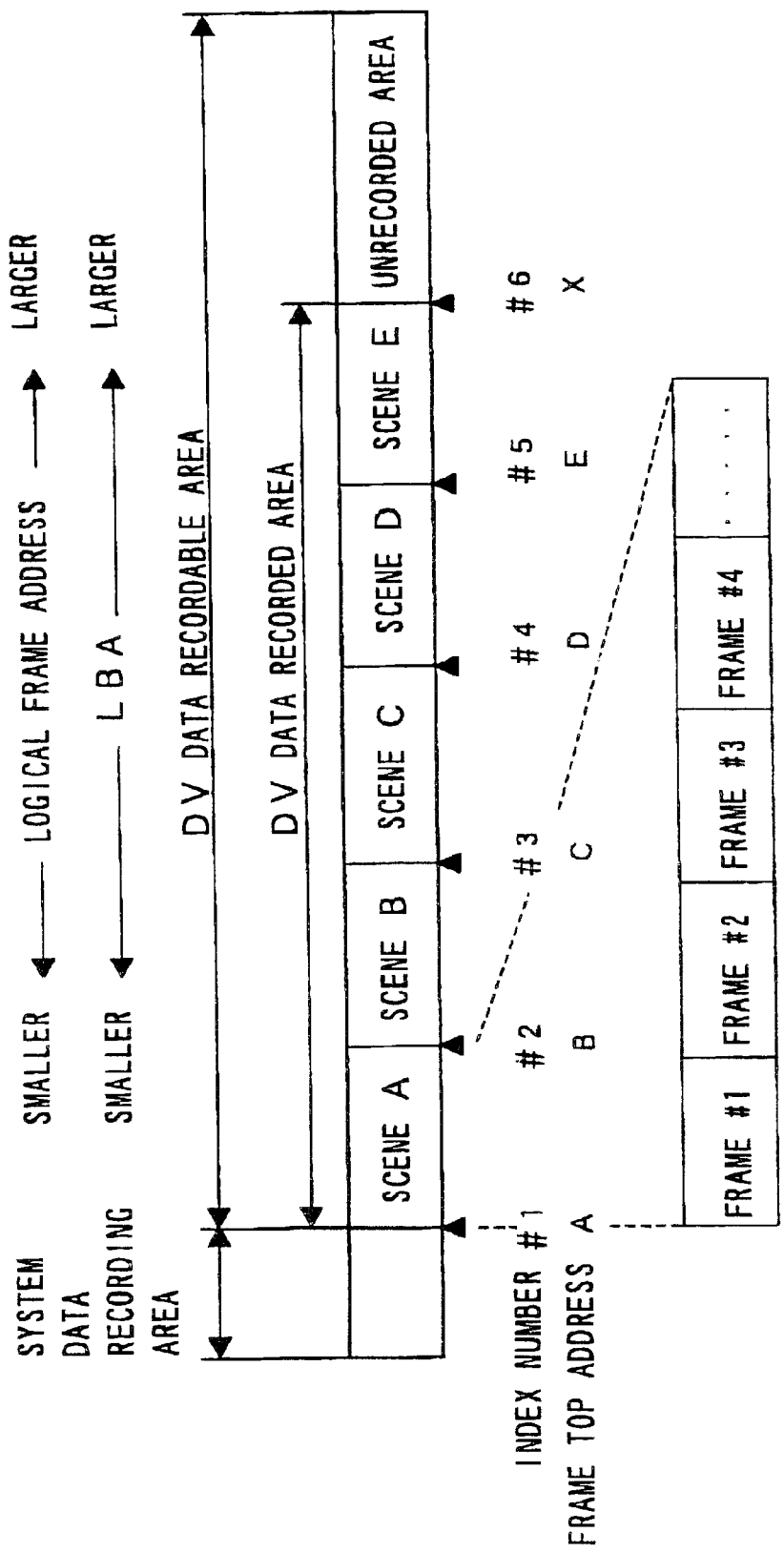
FIG. 2 is an explanatory view showing index information corresponding to DV data recorded on a disk apparatus according to the first embodiment of the present invention.

FIG. 2 is an explanatory view showing the data storage condition in the recording area of the disk apparatus 104. In FIG. 2, the DV frame data are arranged, for example, in the order of frame #1, frame #2, frame #3, frame #4, . . . in a scene A. In FIG. 2, a frame top address A is stored in correspondence with the index number #1.

The video and audio data management unit 109 manages the logical frame address corresponding to each DV frame data. As shown in FIG. 2. when DV frame data are recorded for the first time on the disk apparatus 104 in a completely unrecorded condition, the orders of arrangement of the logical block addresses (LBAs) and the logical frame addresses are completely the same.

Then, the index generation unit 105 takes in necessary information from among the DV data received by the external interface unit 102, analyzes the information, and detects the scene change points of the video scenes. Here, one video scene is defined as DV data of which time information corresponding to DV frame data is continuous. The scene change point is defined as the top DV frame data of each video scene. The information read from the DV data includes shooting date and time information, ATNs (absolute track numbers) and TTCs (title time codes: time codes).

In the case of the DV data, the shooting date and time information is stored in a predetermined area in the DV data while changing, for example, per second (corresponding to approximately 30 video frames in the case of the DV data of NTSC signals). Therefore, when the interval between the shooting dates and times of two continuously stored DV frame data is two seconds or longer, it can be judged that the two DV frame data are different video scenes and the latter video frame is the top frame of a new video scene.

ATNs are recorded such that the numeral of the ATNs increases by ten per one video frame. Therefore, when the difference in ATN between two continuously stored DV frame data is 20 or more, it can be judged that the two DV frame data are different video scenes and the latter video frame is the top frame of a new video scene.

TTCs are recorded such that the numeral of the TTCs increases by one per one frame. Therefore, when the difference in TTC between two continuously stored DV frame data is 2 or more, it can be judged that the latter video frame is the top frame of a new video scene. As shown in FIG. 2, the DV data are analyzed as described above in correspondence with the index numbers #2, #3, #4 and #5, and the frame top addresses B, C, D and E are automatically stored in the disk apparatus 104 as index information.

The scene change points of video scenes may be detected by reading the kinds of the audio signals from among the DV data and detecting the DV data whose audio signals are of the same kind as one video scene. In the disk control apparatus of the first embodiment, data in an auxiliary information area (AAUX area) where auxiliary information on the recorded audio signals is stored are read from among the DV data, and the kinds of the audio signals which will be described later are determined. The kinds of the audio signals are determined by reading auxiliary information on the number of recorded channels, the sampling frequency, the quantization method and the like from the AAUX area. Based on the read auxiliary information, the DV data whose audio signals are of the same kind are selected as one video scene, and the frame top address corresponding to the top of the scene is stored as index information.

Based on the generated index information, the index generation unit 105 writes the index information into part of the DV frame data corresponding to the index information.

In the first embodiment, since video and audio data of the DV format are recorded on the disk apparatus 104, the index information is written in a subcode area, specifically in a tag ID storage area allocated in the DV data.

The data recording and reproducing unit 103 of this embodiment has a header information writing unit that records header information about the DV data recorded on the disk apparatus 104 into DV data. The header information writing unit has a function to write recording start information which is header information into part of DV data when recording is started Specifically, in the DV format, a signal "REC ST" is written into auxiliary information (VAUX) of video signals as the recording start information. It is defined that this information is continuously written into 30 frames from the top frame to be recorded. The signal "REC ST" in the auxiliary information (VAUX) of video signals is used, for example, when the shooting start frame is detected from among the DV data reproduced in a digital VCR apparatus.

The header writing unit also writes the signal "REC ST" into auxiliary information (AAUX) of audio signals as recording start information as header information. However, it is defined that the signal "REC ST" is written only into the top frame to be recorded. Normally, when shooting is performed with a digital VCR apparatus having a camera, audio signals being continuous in each shooting are generated. When a plurality of shot (taken) scenes are continuously reproduced, there are cases where the audio signals cannot be normally reproduced because discontinuous audio signals are reproduced at the boundaries of the scenes. For this reason, for the DV data from such a digital VCR apparatus, the signal "REC ST" in the auxiliary information (AAUX) of audio signals is detected, and the audio signal is initialized for each shot scene.

Figure 3:
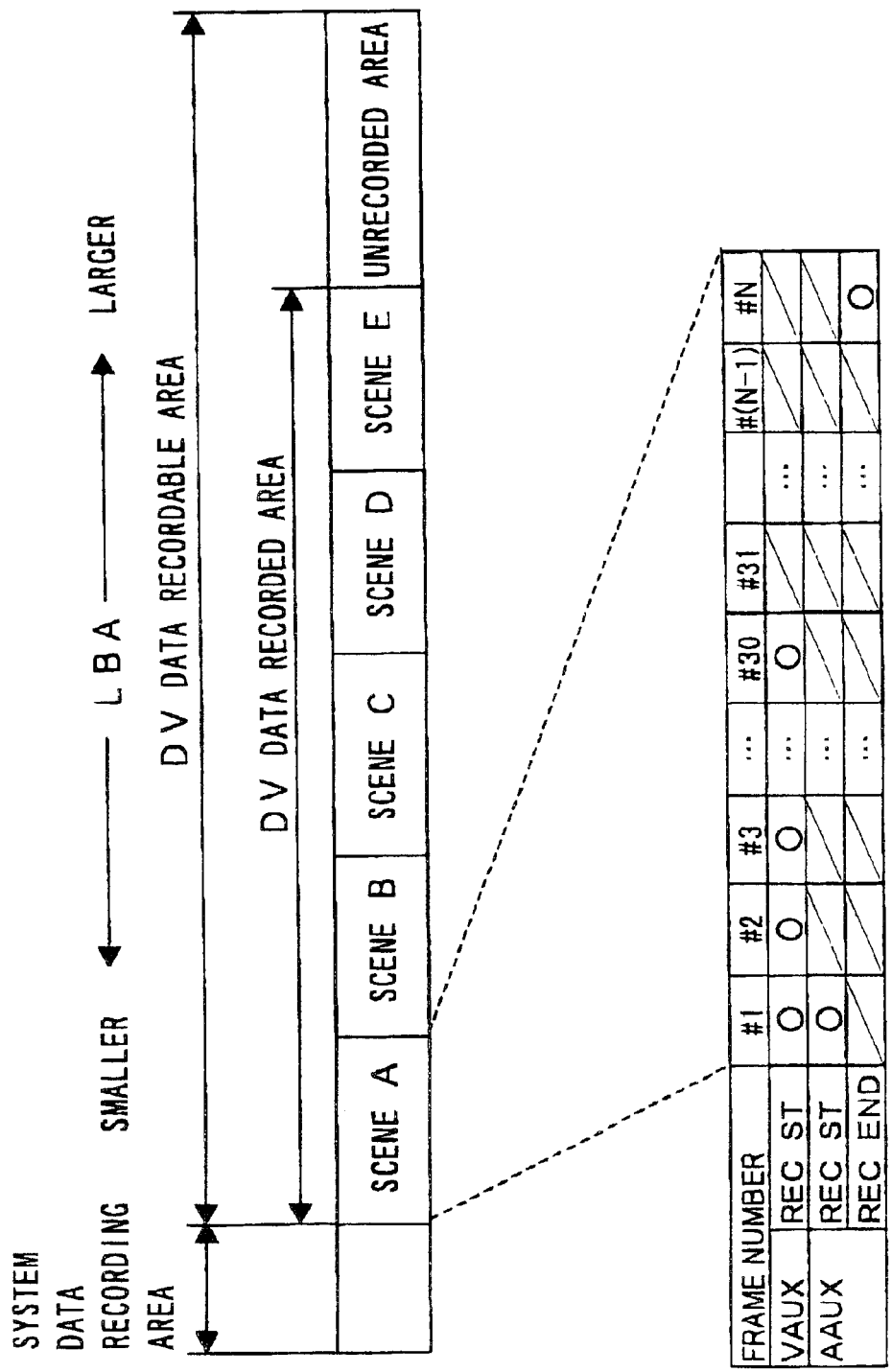
FIG. 3 is an explanatory view showing recording start and end information written by the disk control apparatus according to the first embodiment of the present invention in response to a recording command.

FIG. 3 is an explanatory view of the recording start information written when the above-mentioned scene A is recorded on the disk apparatus 104. As shown in FIG. 3, in the case of the scene A, the signal "REC ST" is written into corresponding frames in the auxiliary information (VAUX) of video signals and in the auxiliary information (AAUX) of audio signals. In FIG. 3, the signal "REC ST" is represented by ○.

[Stop Command Processing]

When a stop command from the external apparatus is accepted, the external interface unit 102 stops the DV data reception processing. When the external interface unit 102 stops the DV data reception processing, the index generation unit 105 reads a frame top address to be recorded on the hard disk device. The frame top address corresponds to the last DV frame data which is received from the video and audio data management unit 109. And the index generation unit 105 stores the frame top address as index information. In the above-mentioned case, as shown in FIG. 2, when the DV data reception processing is stopped, the frame top address corresponding to the index number #6 is stored on the disk apparatus 104 as index information.

The index generation unit 105 stores the index information obtained by analyzing the DV data as described above, and posts it to an index information management unit 106 by following a predetermined procedure.

Based on the index information posted from the index generation unit 105, the index information management unit 106 produces an index management list carrying index numbers and frame top addresses as shown in FIG. 4.

The header information writing unit of the data recording and reproducing unit 103 of this embodiment has a function to write recording end information, which is header information, into a part of DV data when recording is stopped. In the DV format, a signal "REC END" is written into the auxiliary information (AAUX) of audio signals as the recording end information. It is defined that this auxiliary information is written only into the last frame when recording is stopped. In FIG. 3, with respect to the recording end information written in the scene A, the signal "REC END" is represented by ○, and is shown in the column of the frame number #N.

[Re-received Recording Command Processing]

Next, an operation performed when the external interface unit 102 again receives the recording command from the external apparatus will be described.

When receiving the recording command again from the external apparatus, the external interface unit 102 again starts the DV data reception processing as described above. The data recording and reproducing unit 103 starts to record DV data into a recording position in the recording area of the disk apparatus 104 which position corresponds to the current frame top address read from the video and audio data management unit 109.

The index generation unit 105 generates index information like in the above-mentioned recording command processing, and the data recording and reproducing unit 103 successively stores the generated index information into the disk apparatus 104.

[Recording Stop Command Processing]

When the area onto which DV data are re-recorded is in the recorded area, the index generation unit 105 reads the frame top address corresponding to the DV frame data next to the last recorded DV frame data (hereinafter, this next DV frame data will be referred to as un-updated area top frame) from the video and audio data management unit 109, and then stores it as index information. Hereinafter, the above-mentioned recording command processing and recording stop command processing will be referred to as re-recording processing.

The index generation unit 105 posts the index information stored in the above-mentioned re-recording processing to the index information management unit 106.

Based on the new index information received from the index generation unit 105, the index information management unit 106 deletes the last index information corresponding to the re-recorded area from the index information list.

Figure 5:
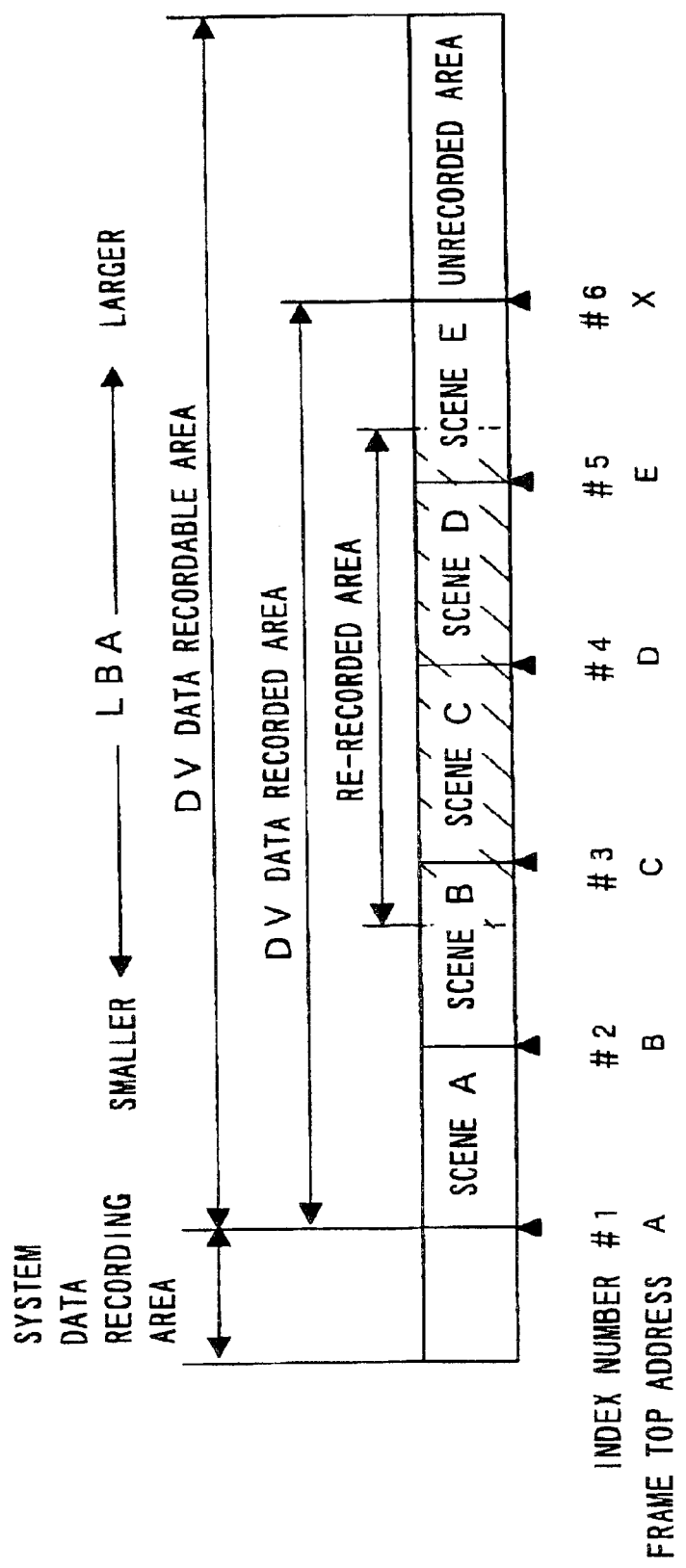
FIG. 5 is an explanatory view showing re-recorded areas for the DV data recorded on the disk apparatus according to the first embodiment of the present invention.

FIG. 5 is an explanatory view of a case where video frames are newly recorded in the recording area of the disk apparatus 104. As shown in FIG. 5, when new DV data are re-recorded into the recording areas of the scenes B, C and D shown in FIG. 2, the last frame top addresses C, D and E corresponding to the last index numbers #3, #4 and #5 are deleted from the index management list.

Then, the new index information received from the index generation unit 105 is added to the index management list.

Figure 6:
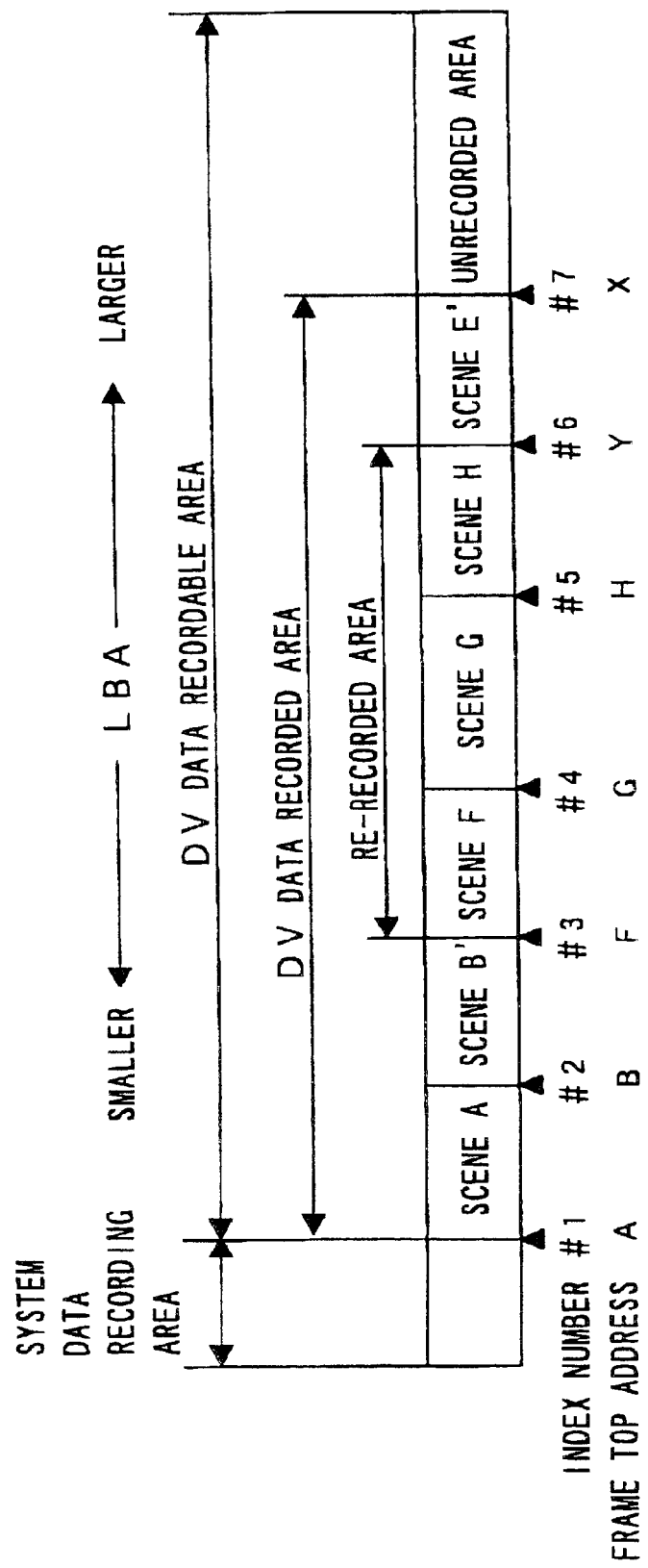
FIG. 6 is an explanatory view showing index information corresponding to the DV data after the DV data are re-recorded onto the disk apparatus according to the first embodiment of the present invention.

FIG. 6 is an explanatory view of a case where video frames (scenes F, G and H) are newly recorded in the recording area of the disk apparatus 104. As shown in FIG. 6, when the newly recorded DV frame data of the scenes F, G and H are recorded into the recording area of the disk apparatus 104, the frame top addresses F, G, H and Y corresponding to the index numbers #3, #4, #5 and #6 are added to the index management list. At this time, the index information management unit 106 rearranges the index numbers in the order of increasing frame top address, that is, in the order of logical frame address on the disk apparatus 104. When erasure processing described later is not performed, the order coincides with the order of LBA on the disk apparatus 104. In FIG. 6, scenes B' and E' are video scenes comprising partly deleted scenes B and C, respectively.

FIG. 7 is a view showing an example of the index management list after the re-recording. The index information management unit 106 temporarily stores the index information posted from the index information generation unit 105 as the index management list. Moreover, the index information management unit 106 stores the index information stored as the index management list into the system data recording area of the disk apparatus 104 at predetermined intervals.

As described above, in the disk control apparatus 100 of the first embodiment, since the index information is stored on the disk apparatus 104, the immediately preceding index information can be used later even when the disk control apparatus 100 is momentarily turned off.

[Key Input Processing]

Next, an operation will be described which is performed when an index registration key provided on a key input device 107 is depressed during the above-mentioned recording processing or re-recording processing and the index information at that time is input.

The key input device 107 posts an index registration request to a key input acceptance unit 108 provided in the disk control apparatus 100 every time the index registration key is depressed.

In response to the index registration request from the key input device 107, the key input acceptance unit 108 posts an index generation request to the index generation unit 105.

In response to the index generation request from the key input acceptance unit 108, the index generation unit 105 posts a frame top address reading request to the video and audio data management unit 109, reads the current frame top address, and stores it as index information. The index generation unit 105 posts the stored index information to the index information management unit 106, and writes the index information into the subcode area of the corresponding DV data.

In response to the index information posted from the index generation unit 105, the index information management unit 106 adds the index information to the index management list.

Even when DV data recorded on the disk apparatus 104 are being reproduced, every time the index registration key is depressed, the index information at that time corresponding to the DV data being currently reproduced is generated as above.

[Video and Audio data All Erasure Command]

Next, a case will be described where a video and audio data all erasure command to erase all the DV data recorded on the disk apparatus 104 is externally input to the external interface unit 102.

When the all erasure command for the DV data recorded on the disk apparatus 104 is externally received, the external interface unit 102 posts an all erasure request to the video and audio data management unit 109 and the index information management unit 106.

The video and audio data management unit 109 having received the all erasure request clears (invalidates) the last recorded frame address in response to the all erasure request.

The index information management unit 106 erases all the index information registered in the index management list in response to the all erasure request.

[Video and Audio data Block Erasure Command]

Next, a case will be described where a block erasure command to erase blocks from the DV data recorded on the disk apparatus 104 is externally input to the external interface unit 102.

When the block erasure command for a part of the DV data recorded on the disk apparatus 104 is externally received, the external interface unit 102 posts a block erasure request to the video and audio data management unit 109 and the index information management unit 106.

The video and audio data management unit 109 having received the block erasure request invalidates the DV data in the specified recording area in units of blocks in response to the block erasure request.

The index information management unit 106 erases, of the index information stored in the index management list, the index information corresponding to the recording area of the DV data to be erased, from the index management list in response to the block erasure request.

Figure 8:
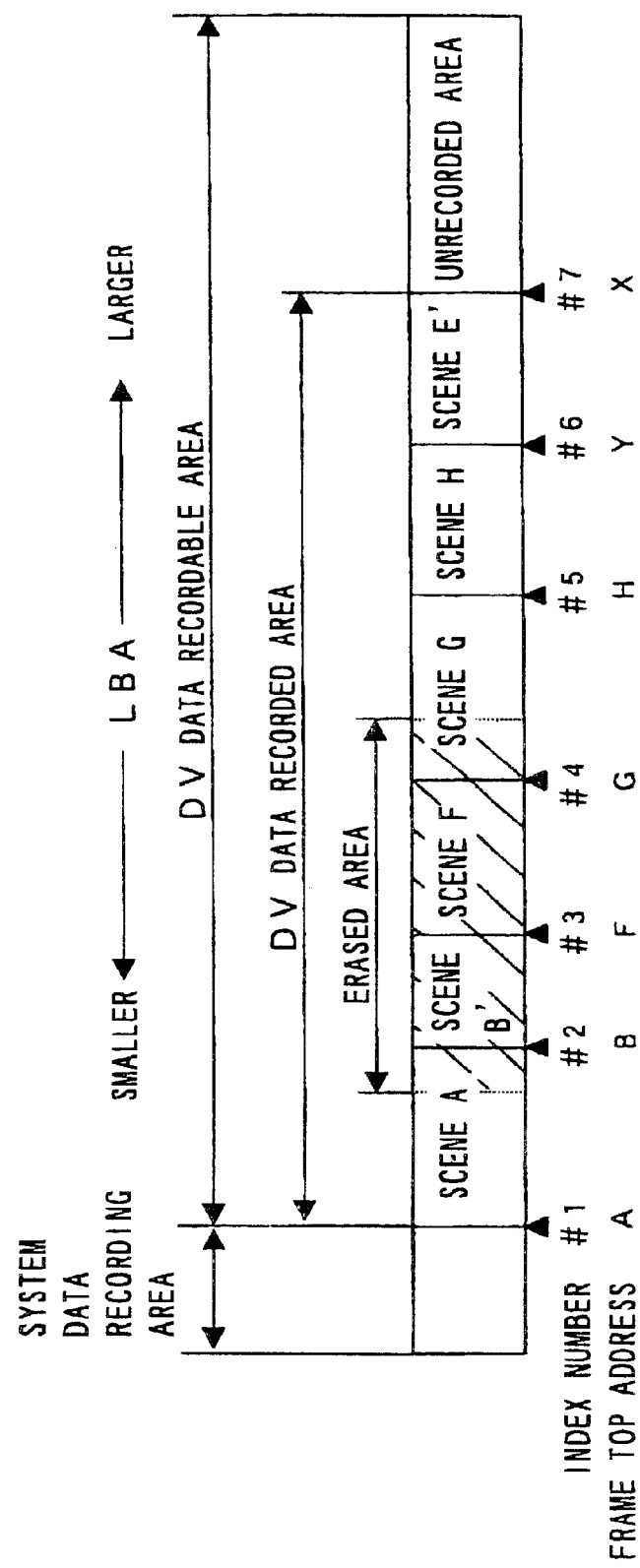
FIG. 8 is an explanatory view showing an erased area for the DV data recorded on the disk apparatus according to the first embodiment of the present invention.

FIG. 8 is an explanatory view showing an example of a case where a DV data recorded area is newly erased in units of blocks in the recording area of the disk apparatus 104. As shown in FIG. 8, when it is requested to erase the DV data recorded area shown in FIG. 6, the frame top addresses B, F and G corresponding to the index numbers #2, #3 and #4 are erased from the index management list. Further, index information corresponding to the frame adjoining the erased area is added.

Figure 9:
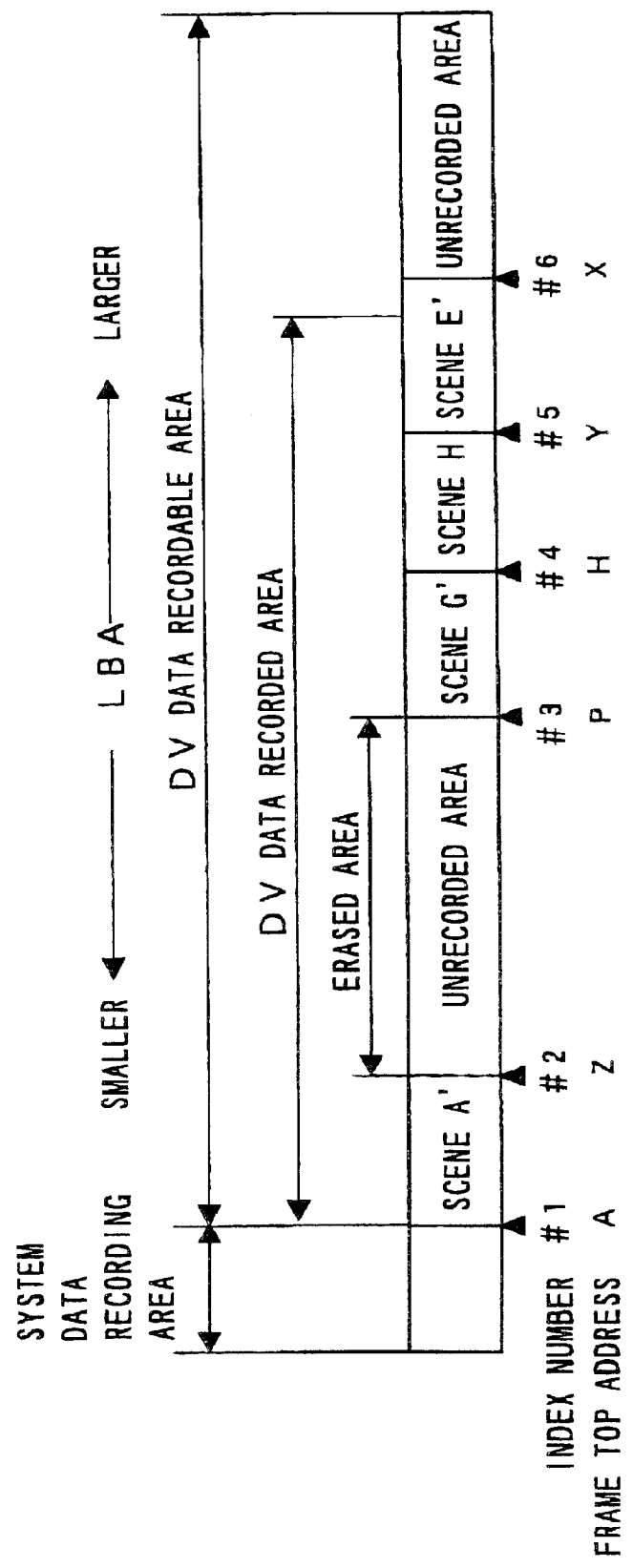
FIG. 9 is an explanatory view showing index information corresponding to the DV data after part of the DV data recorded on the disk apparatus according to the first embodiment of the present invention is erased.

FIG. 9 is an explanatory view showing a condition in a case where DV data are erased as shown in FIG. 8 in the recording area of the disk apparatus 104. As shown in FIG. 9, frame top addresses Z and P corresponding to the index numbers #2, and #3 are added as index information. In FIG. 9, scenes A' and G' are video scenes comprising partly deleted scenes A and G, respectively. FIG. 10 is a view showing the index management list after the processing corresponding to the block erasure request is performed.

Figure 11:
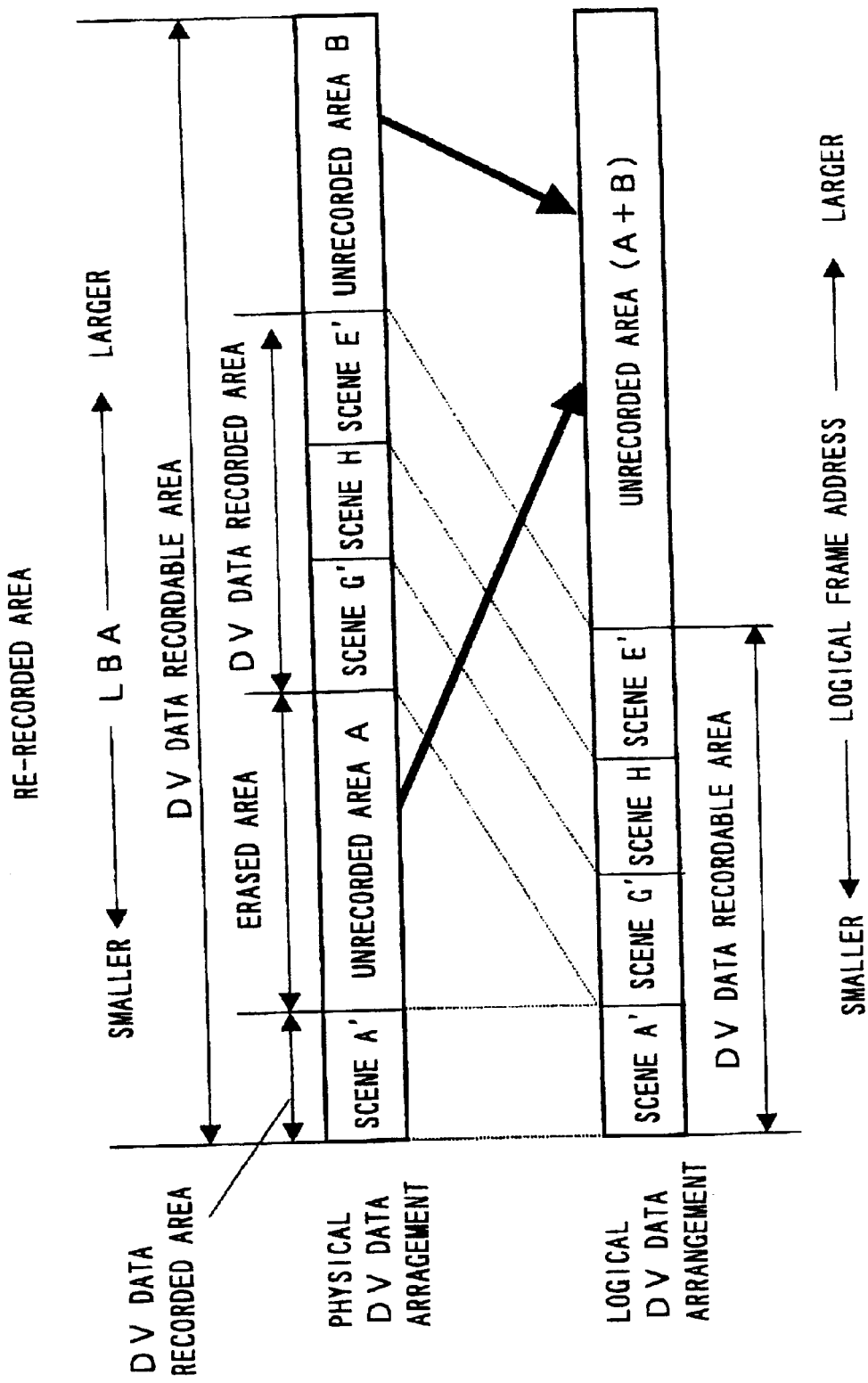
FIG. 11 is an explanatory view showing the logical DV data arrangement corresponding to the DV data after part of the DV data recorded on the disk apparatus according to the first embodiment of the present invention is erased.

The video and audio data management unit 109 rearranges the recording areas as shown in FIG. 11 That is, in response to the block erasure request, the video and audio data management unit 109 assigns continuous logical frame addresses to the physically separated recording areas of the scene A' and the scenes G', H and E' so that the scenes A', G', H and E' are disposed in logically continuous recording areas for management. Consequently, unrecorded areas A and B separated in the recording area aggregate.

Figure 12:
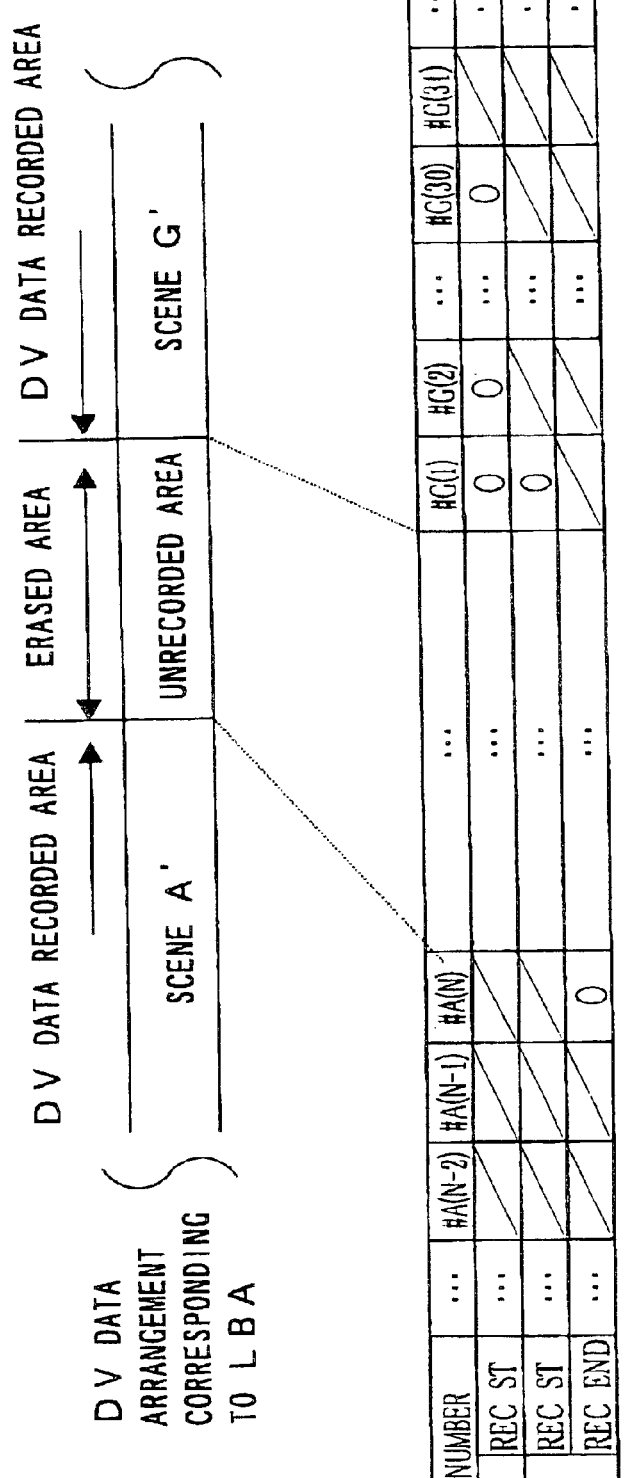
FIG. 12 is an explanatory view showing recording start and end information rewritten by the disk control apparatus according to the first embodiment of the present invention in response to a video and audio data block erasure command.

FIG. 12 is an explanatory view explaining processing for the data recording and reproducing unit 103 to add recording start and end information to the frames adjoining the erased area in response to a recording start and end information addition request from the video and audio data management unit 109. When the erased area is registered as an unrecorded area in response to the block erasure request, the video and audio data management unit 109 requests the data recording and reproducing unit 103 to write the signal "REC END" as the auxiliary information (AAUX) of audio signals to the last one of the frames (scene A' ) recorded immediately before the unrecorded area. In response to the request from the video and audio data management unit 109, the data recording and reproducing unit 103 reads the last frame of the scene A' from the disk apparatus 104, writes the signal "REC END" as the auxiliary information (AAUX) of audio signals, and then, writes the last frame of the scene A' back into the disk apparatus 104. Further, the video and audio data management unit 109 requests the data recording and reproducing unit 103 to write the signal "REC ST" as the auxiliary information (VAUX) of video signals and the signal "REC ST" as the auxiliary information (AAUX) of audio signals to the 30 frames (scene G') recorded immediately behind the unrecorded area. In response to the request from the video and audio data management unit 109, the data recording and reproducing unit 103 performs the processing described below.

First, the top frame of the scene G' is read from the disk apparatus 104, and after the signal "REC ST" is written to each of the auxiliary information (VAUX) of video signals and the auxiliary information (AAUX) of audio signals, the top frame is written back to the disk apparatus 104.

Then, the second to the thirtieth frames of the scene G' are read from the disk apparatus 104 frame by frame, and the frames are written back to the disk apparatus 104 after the signal "REC ST" as the auxiliary information (VAUX) of video signals is written to each of them.

As described above, in the disk control apparatus 100 of this embodiment, the signal "REC ST" of the auxiliary information (VAUX) of video signals is newly written into the recording areas separated by block erasure. Consequently, the external apparatus connected through the IEEE 1394 bus 101 can easily detect video scenes separated by block erasure by searching for the signal "REC ST". Moreover, the disk control apparatus of this embodiment is capable of performing initialization of audio signal reproduction processing and the like by detecting the signal "REC ST" as the auxiliary information (AAUX) of audio signals, so that audio signals can be normally reproduced.

[Index Video Reproduction Command]

Next, a case will be described where the disk control apparatus 100 of the first embodiment externally receives an index video reproduction command.

When the disk control apparatus 100 externally receives an index video reproduction command, the external interface unit 102 posts an index reproduction request to the index information management unit 106.

The index information management unit 106 having received the index reproduction request selects one frame top address from the index information registered in the index management list by a predetermined method in response to the index reproduction request. Then, the index information management unit 106 posts to the data recording and reproducing unit 103 a request to reproduce the DV frame data corresponding to the selected frame top address.

The data recording and reproducing unit 103 reads the DV frame data requested by the index information management unit 106 from the disk apparatus 104, and sends it onto the IEEE 1394 bus 101 through the external interface unit 102.

When an apparatus provided with a video display unit such as a digital VCR apparatus is connected onto the IEEE 1394 bus 101, the video frame corresponding to the index information can be displayed as a still image. For this reason, the top frame of a video scene can be easily confirmed by using the disk control apparatus 100 of the first embodiment.

[Index Information Reading Command]

Next, a case will be described where the disk control apparatus 100 of the first embodiment externally receives an index information reading command.

When the disk control apparatus 100 externally receives an index information reading command, the external interface unit 102 posts an index reading request to the index information management unit 106.

The index information management unit 106 having received the index reading request selects the frame top address from the index management list by a predetermined method. Further, the index information management unit 106 converts the information corresponding to the selected frame top address into an externally specified format (for example, a format of ATN or TTC), and posts It to the external interface unit 102.

The external interface unit 102 sends the index information received from the index information management unit 106 onto the IEEE 1394 bus 101 by following a predetermined procedure.

In this embodiment, the externally input index information corresponds to the arrangement of the order of the recorded areas from the top because it is specified as a logical address.

[Index Information Addition Command]

Next, a case will be described where the disk control apparatus 100 of the first embodiment externally receives an index information addition command and the index information thereof.

When the disk control apparatus 100 externally receives an index information addition command and the index information thereof, the external interface unit 102 posts an index addition request to the index information management unit 106, and transfers the externally received index information. In response to the index addition request from the external interface unit 102, the index information management unit 106 adds the index information transferred from the external interface unit 102 to the index management list.

[Index Information Erasure Command]

Next, a case will be described where the disk control apparatus 100 of the first embodiment externally receives an index information erasure command.

When the disk control apparatus 100 externally receives an index information erasure command, the external interface unit 102 posts an index erasure request to the index information management unit 106. In response to the index erasure request from the external interface unit 102, the index information management unit 106 deletes the externally specified index information from the index management list.

As described above, in the disk control apparatus 100 of the first embodiment, new index information is automatically generated in accordance with recording processing and erasure processing of DV data, and the index information is stored. Consequently, the disk control apparatus 100 of the first embodiment is capable of always reproducing the DV frame data at the top of a video scene with ease and reliability in response to a reproduction request based on external index information.

While an example using a hard disk device as the disk apparatus 104 has been described in the first embodiment, the present invention is not limited to this structure. Any disk apparatus that performs recording and reproducing of a recording medium may be used; similar effects are obtained, for example, when an optical disk apparatus is used.

While the disk apparatus 104 and the disk control apparatus 100 are connected by an IDE interface in the first embodiment, the connection means of the present invention may be any interface means which is capable of transmitting digital signals such as a SCSI interface, and is not limited to the structure of the first embodiment.

<Second Embodiment>

Figure 13:
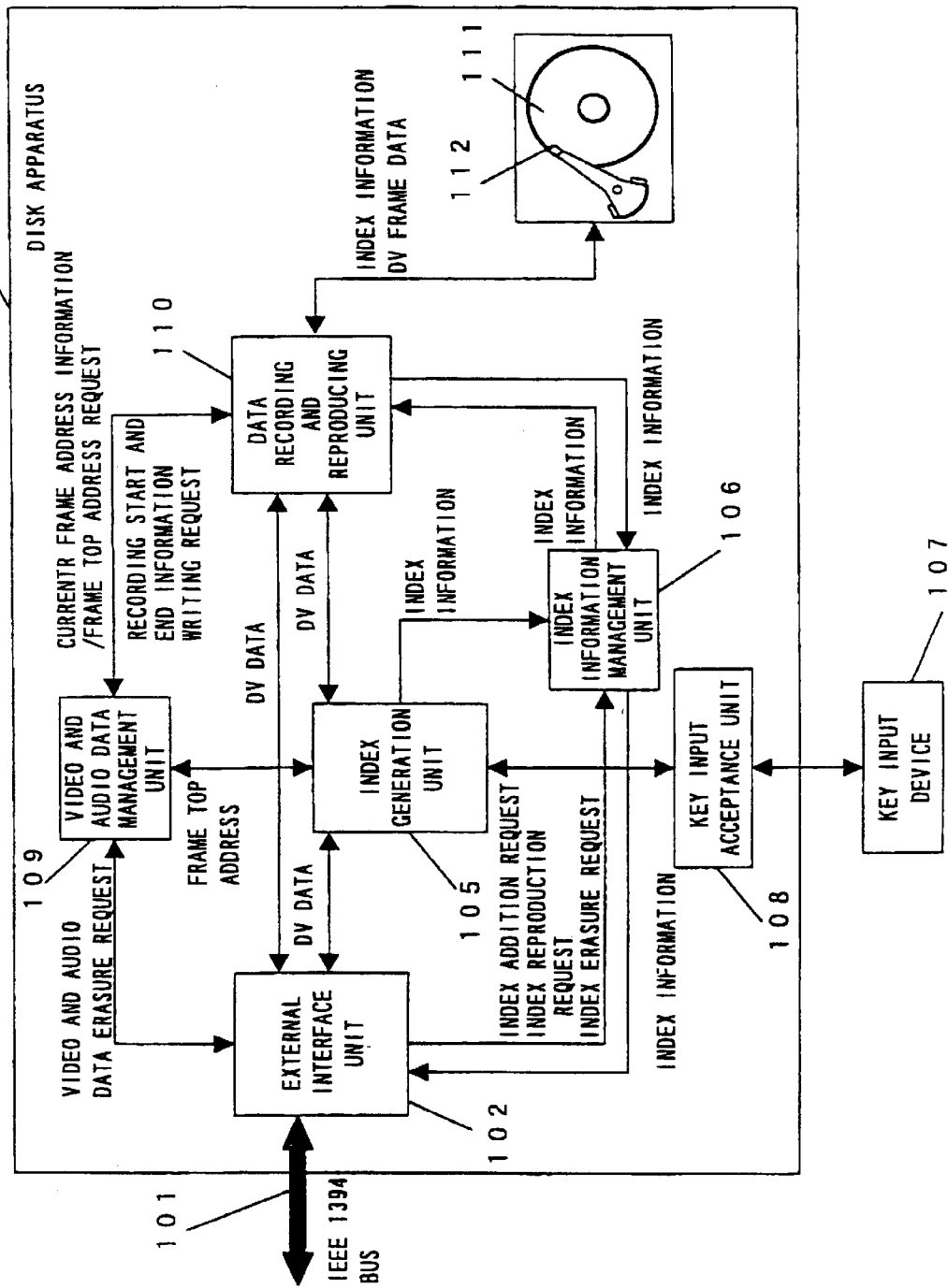
FIG. 13 is a block diagram showing the structure of a disk apparatus according to a second embodiment of the present invention.

Next, a disk apparatus according to a second embodiment of the present invention will be described. FIG. 13 is a block diagram showing the configuration of the disk apparatus of the second embodiment.

In FIG. 13, parts and elements having similar functions and structures to those of the first embodiment shown in FIG. 1 are denoted by the same reference numerals, and descriptions thereof are omitted.

The disk apparatus of the second embodiment has the function of the disk control apparatus of the first embodiment, and includes means the same as those of the disk control apparatus of the first embodiment.

As shown in FIG. 13, the disk apparatus of the second embodiment has therein a magnetic disk 111 which serves as a recording medium, and a magnetic head 112 which writes and reads digital signals onto and from the magnetic disk 111. The data recording and reproducing unit 110, which controls the data recording and reproducing onto and from the disk apparatus through an IDE interface in the first embodiment, controls the digital signal writing and reading onto and from the magnetic disk 111 through the magnetic head 112 in the second embodiment.

In FIG. 13, the blocks denoted by the same numbers as those of the first embodiment perform similar processing to that of the first embodiment. Therefore, in response to various requests from the external apparatus connected to the IEEE 1394 bus 101 and the key input device 107, the blocks of the disk apparatus of the second embodiment perform similar operations to those of the first embodiment.

In the disk apparatus of the second embodiment, it is possible to configure the function of the disk control apparatus of the first embodiment with an electric/electronic circuit and mount it in the disk apparatus. Consequently, compared to the case where the disk control apparatus and the disk apparatus are separate devices like in the first embodiment, the cost and the size are small as a disk apparatus recording and reproducing video and audio data.

While DV data are written onto a magnetic disk serving as the storage medium in the above-mentioned embodiments, the same effects are obtained when similar operations to those of the above-mentioned embodiments are performed with an optical disk as the storage medium.

While the disk control apparatus and the disk apparatus of the above-mentioned embodiments are connected to the external apparatus through the IEEE 1394 bus, any bus which is capable of transmission and reception of DV data may be used in the present invention; the present invention is not limited to the structure of the embodiment.

As is apparent from the detailed description of the above-mentioned embodiments, the present invention has the following technical advantages:

The disk control apparatus and the disk apparatus of the present invention have a function to newly generate index information or perform processing by handling the recording areas which are separated by an erased area produced therebetween such that the separated recording area are logically continuous areas in case the video and audio data recorded on the disk apparatus are replaced with input video and audio data from external source or in case some of the video and audio data are erased. Consequently, with the disk control apparatus and the disk apparatus of the present invention, edit processing can be easily performed even after video and audio data recorded on the disk apparatus are replaced with external video and audio data and after some of the video and audio data are erased.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A disk control apparatus comprising:

an interface unit for receiving externally input video and audio data;

a data recording and reproducing unit for writing and reading the video and audio data received by said interface unit onto and from a disk apparatus; and a video and audio data management unit for managing a recording area of said disk apparatus by dividing the recording area into a recorded area in which video and audio data have already been recorded and an unrecorded area in which no video and audio data is recorded, and a header information writing unit for writing header information on the video and audio recorded on said disk apparatus into the video and audio data, wherein in response to an external block erasure request, said video and audio data management unit erases an area requested to be erased from the recorded area, adds the area requested to be erased to the unrecorded area, and assigns continuous logical addresses to the video and audio data in the recorded area, said header information writing unit writes at least one recording start information and recording end information to the video and audio data separated by the erased recording area, and said interface unit outputs the video and audio data on which at least one of recording start information and recording end information is recorded.

2. A disk control apparatus in accordance with claim 1, further comprising:

an index generation unit for generating index information by analyzing the video and audio data received by said interface unit; and an index information management unit for managing the index information generated by said index generation unit, wherein said index generation unit generates index information corresponding to the video and audio data in each of the recorded areas separated by the erased recording area, and said index information management unit deletes corresponding index information in response to the external block erasure request.

* * * * *